(12) United States Patent
Ahn et al.

(10) Patent No.: US 8,750,885 B2
(45) Date of Patent: Jun. 10, 2014

(54) INTERFERENCE MITIGATION METHOD IN CELLULAR SYSTEM BASED ON ORTHOGONAL FREQUENCY DIVISION MULTIPLE ACCESS

(75) Inventors: Jae Young Ahn, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 980 days.

(21) Appl. No.: 12/866,103

(22) PCT Filed: Feb. 4, 2009

(86) PCT No.: PCT/KR2009/000527
§ 371 (c)(1),
(2), (4) Date: Aug. 6, 2010

(87) PCT Pub. No.: WO2009/099289
PCT Pub. Date: Aug. 13, 2009

(65) Prior Publication Data
US 2010/0322109 A1    Dec. 23, 2010

(30) Foreign Application Priority Data

Feb. 4, 2008  (KR) .................. 10-2008-0011326
Sep. 11, 2008  (KR) .................. 10-2008-0089608

(51) Int. Cl.
*H04W 40/00*   (2009.01)
*H04W 12/02*   (2009.01)

(52) U.S. Cl.
CPC .................................. *H04W 12/02* (2013.01)
USPC .......................................... 455/447; 455/450

(58) Field of Classification Search
CPC ..................................................... H04W 16/02
USPC .................... 455/69, 70, 522, 450–455, 447; 370/318–320, 252, 328, 329, 331, 431
See application file for complete search history.

(56) References Cited

U.S. PATENT DOCUMENTS

| 8,126,495 | B2 * | 2/2012 | Wu et al. ........................ 455/522 |
| 8,238,959 | B2 * | 8/2012 | Roh et al. ....................... 455/522 |
| 8,428,640 | B2 * | 4/2013 | Kim et al. ...................... 455/522 |
| 2002/0181388 | A1 * | 12/2002 | Jain et al. ...................... 370/208 |
| 2006/0193374 | A1 * | 8/2006 | Guo et al. ...................... 375/148 |
| 2007/0211786 | A1 * | 9/2007 | Shattil ............................ 375/141 |
| 2009/0047971 | A1 * | 2/2009 | Fu .................................. 455/450 |
| 2009/0069043 | A1 * | 3/2009 | Roh et al. ....................... 455/522 |

(Continued)

FOREIGN PATENT DOCUMENTS

KR   1020050048261   5/2005
KR   1020060064459   6/2006

*Primary Examiner* — Hassan Phillips
*Assistant Examiner* — Ajay Cattungal
(74) *Attorney, Agent, or Firm* — Nelson Mullins Riley & Scarborough LLP; Anthony A. Laurentano, Esq.; Lewis Lee, Esq.

(57) ABSTRACT

An inter-cell interference mitigation method in an orthogonal frequency division multiple access (OFDM)-based cellular system includes: dividing wireless resources into a resource group for fractional frequency reuse and a resource group for removing inter-cell interference; and re-dividing the resource group for fractional frequency reuse into particular resource groups numbering the same as a number of cell types of fractional frequency reuse, and applying a maximum transmission power to a particular resource group according to a cell type for fractional frequency reuse.

17 Claims, 7 Drawing Sheets

(56) References Cited

U.S. PATENT DOCUMENTS

| | | | |
|---|---|---|---|
| 2009/0110033 A1* | 4/2009 | Shattil | 375/141 |
| 2009/0129401 A1* | 5/2009 | Kang et al. | 370/431 |
| 2009/0247171 A1* | 10/2009 | Suga | 455/447 |
| 2009/0291691 A1* | 11/2009 | Jeong et al. | 455/450 |
| 2010/0034157 A1* | 2/2010 | Stolyar et al. | 370/329 |
| 2010/0105406 A1* | 4/2010 | Luo et al. | 455/452.2 |
| 2011/0051685 A1* | 3/2011 | Saitou | 370/331 |
| 2011/0103241 A1* | 5/2011 | Cho et al. | 370/252 |
| 2011/0134759 A1* | 6/2011 | Kim et al. | 370/242 |
| 2011/0194423 A1* | 8/2011 | Cho et al. | 370/252 |

* cited by examiner

610

620

710

720

810

820

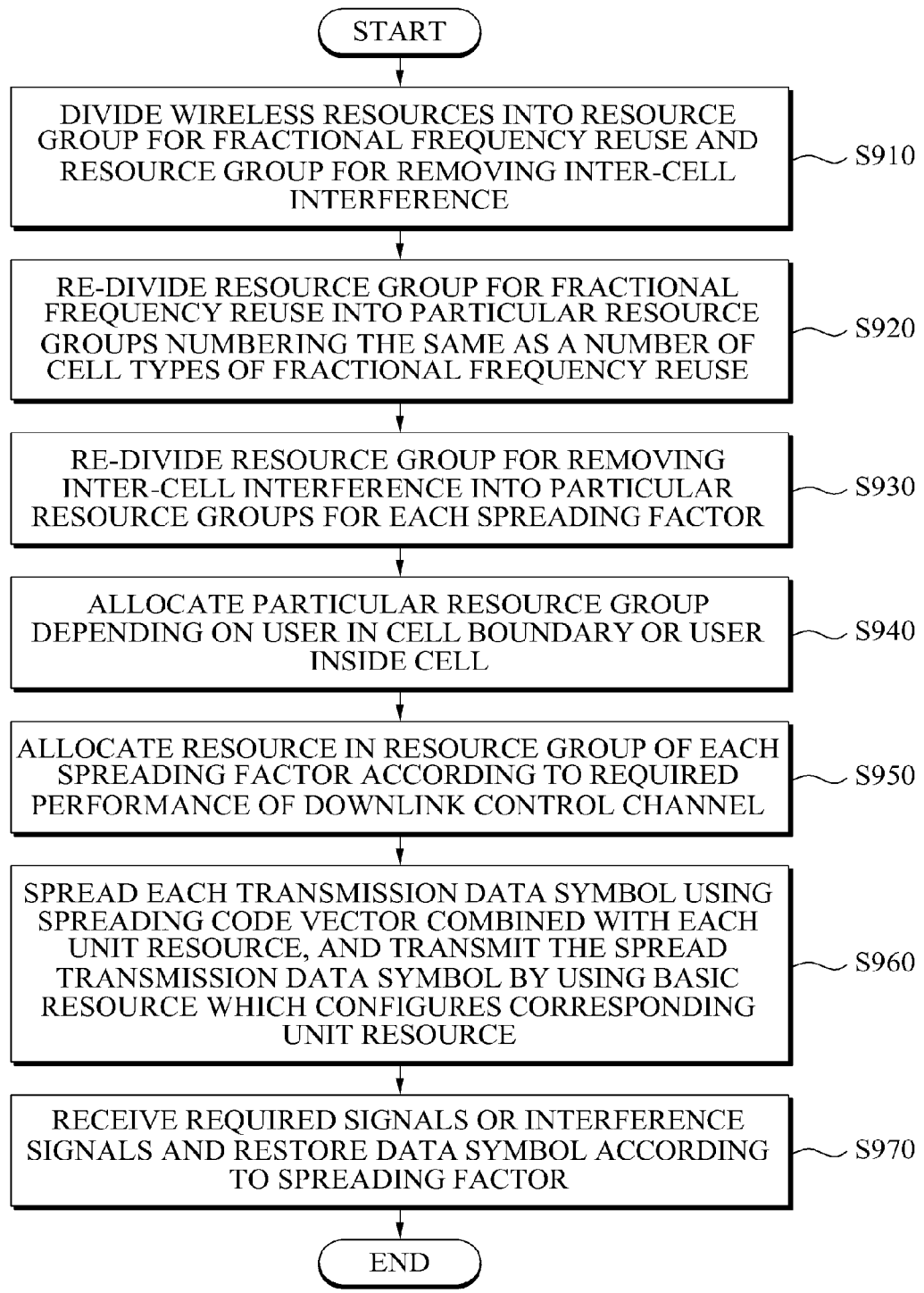

INTERFERENCE MITIGATION METHOD IN CELLULAR SYSTEM BASED ON ORTHOGONAL FREQUENCY DIVISION MULTIPLE ACCESS

RELATED APPLICATIONS

This application is a 35 U.S.C. §371 national stage filing of PCT Application No. PCT/KR2009/000527 filed on Feb. 4, 2009, which claims priority to, and the benefit of, Korean Patent Application No. 10-2008-0011326 filed on Feb. 4, 2008 and Korean Patent Application No. 10-2008-0089608 filed on Sep. 11, 2008. The contents of the aforementioned applications are hereby incorporated by reference.

TECHNICAL FIELD

The present invention relates to an interference mitigation method based on an orthogonal frequency division multiple access (OFDMA), hereinafter, referred to as "OFDMA", and more particularly, to a cell interference mitigation method of adopting fractional frequency reuse for a concept of interference avoidance for enhancing efficiency of a user's spectrum in a cell boundary or of integrating cell removing schemes using multiple receiving antennas and a diffusion code.

This work was supported by the IT R&D program of MIC/IITA [2006-S-001-03, The Development of adaptive wireless access and transmission technology for fourth generation mobile communication radio frequency identification (RFID) for Application of Individual Product Unit].

BACKGROUND ART

Conventional cellular systems based on Frequency Division Multiple Access (FDMA) or Time Division Multiple Access (TDMA) were intended to avoid interferences. Since, in those conventional cellular systems, adjacent cells do not share common resources, it was possible to achieve a sufficient signal to interference ratio (SIR), yet a lower system capacity due to frequency reuse efficiency could not be inevitable. Since the conventional cellular systems based on FDMA or TDMA were mostly targeting voice services having a constant data rate, increasing a number of available channels having a sufficient SIR through electric power control corresponds to increasing a capacity in the conventional cellular systems based on FDMA or TDMA. From this point, a voice system based on Code Division Multiple Access (CDMA) which significantly increases efficiency in frequency reuse was spread, and through interference averaging and reducing a range of fluctuation per channel, that an acceptable level of interferences in a great number of channels was achieved. However, as the main intention of the service was changed from the voice service which has the constant data rate to a packet service which has a flexible data rate, maintaining the adequate interference through averaging interference was not always optimized. Also, as technology of Orthogonal Frequency Division Multiple/Orthogonal Frequency Division Multiple Access (OFDM/OFDMA) is developed for a cellular domain, which is adequate for avoiding interference, the interference issues with adjacent cells resurfaced.

In order to resolve the interference issue in the adjacent cells in the OFDM/OFDMA based cellular environment, an interface averaging using frequency hopping is frequently used. Using different hopping patterns, although not at the level of averaging within a symbol of CDMA, it is possible to achieve sufficient averaging within encoded packets.

In such interference averaging, there is a mechanism for partially applying interference avoidance of a frequency reuse concept to divide overall resources into a resource space and a secondary resource space. In this mechanism, traffic with similar properties are collected and allocated to a single resource space and a single secondary resource space. The conventional method introduced matching traffic having similar properties with each other in multi cell environments. In an example embodiment of the conventional method, all cells are divided into three frequency reuse patterns, and one resource space is divided into three secondary resource spaces, and each of three cells mainly uses one of the three secondary resource spaces and allows transmission with a relatively large electrical power and for the remaining two secondary resource spaces, a small, restricted amount of electrical power is permitted for the transmission to limit the interferences to the adjacent cells. With such an example embodiment of the conventional method, in actuality, when a user having inferior channel properties in a cell boundary communicates with a frequency reuse factor of 3 using ⅓ of overall resources, another user having superior channel properties may perform communications without affecting users around a base station.

In a frequency reuse method based on an identical concept of the above conventional method, users inside a cell operate with a frequency reuse factor of 1, and users in a cell boundary operate with a frequency reuse factor of 3. In overall resources, there are common resources shared by the users inside a cell, and the remaining resources are divided into three parts for users in the cell boundary, for each of the cells.

To simultaneously overcome the conventional issues of the users in the cell boundary and the issues of the efficiency in frequency reuse, a method for managing an inter-cell interference based on directivity and concentration of interferences in uplinks has been provided. Each terminal has a different level of interference affecting adjacent cells for each adjacent base station, and looks up a base station which the terminal is affected by the greatest interference. Using this property inversely, each of the base stations collects terminals with great interferences and receives the collected interferences at one time. This mechanism would seldom result in a great level of interference, yet it is overall beneficial since the interference level is significantly low in most cases. Also, the interference level is low as well when a terminal in the cell boundary is being serviced, thereby improving the performance.

The above method is for the uplink, and a method for a downlink also intends to a direction of utilizing great interference, here, benefit may be obtained from reducing an electrical power in base stations which gives great interference. Conversely, a terminal performs communication when electrical power in a base station with great interferences are reduced. The operations may differ, yet geographical dispositions of the terminals are largely similar, and this mechanism of downlinks is relatively simpler than the previous mechanism of uplinks.

However, even with the conventional fractional frequency reuse methods employed, irregular cell arrays and shadowing effects from the obstacles in a propagation route of radio waves result in users in the cell boundary experiencing the inter-cell interferences, and the above methods may not provide a solution to such issues.

Also, since the conventional fractional frequency reuse methods are intended for traffic channels or for controlling channels for specific users, such methods fail to resolve the issues of inter-cell interferences of downlink control channels which may be receivable by all terminals.

DISCLOSURE OF INVENTION

Technical Problem

The present invention provides an inter-cell interference mitigation method for a user in a cell boundary by performing unified inter-cell interference removal using a multiple receiving antenna and a spreading code as well as by employing a fractional frequency reuse scheme with an interference avoidance concept, in an orthogonal frequency division multiple access (OFDMA)-based cellular system, thereby enhancing spectrum efficiency of the user in the cell boundary.

Technical Solution

According to an aspect of the present invention, there is provided an inter-cell interference mitigation method in an orthogonal frequency division multiple access (OFDMA)-based cellular system including: dividing wireless resources into a resource group for fractional frequency reuse and a resource group for removing inter-cell interference; and re-dividing the resource group for fractional frequency reuse into particular resource groups numbering the same as a number of cell types of fractional frequency reuse, and applying a maximum transmission power to a particular resource group according to a cell type for fractional frequency reuse.

According to another aspect of the present invention, there is provided an inter-cell interference mitigation method in an OFDMA-based cellular system including: dividing wireless resources into a resource group for fractional frequency reuse and a resource group for removing inter-cell interference; re-dividing the resource group for fractional frequency reuse into particular resource groups numbering the same as a number of cell types of fractional frequency reuse; re-dividing the resource group for removing inter-cell interference into particular resource groups for each spreading factor; allocating a particular resource group depending on a user in a cell boundary or a user inside a cell; allocating a resource in the resource group for each spreading factor according to required performance of a downlink control channel; spreading each transmission data symbol using a spreading code vector combined with each unit resource, and transmitting the spread transmission data symbol using a basic resource configuring a corresponding unit resource, when the resource group for removing inter-cell interference of the spreading factor is allocated; and restoring a data symbol according to a spreading factor by receiving required signals or interference signals.

According to still another aspect of the present invention, there is provided an inter-cell interference mitigation method in an OFDMA-based cellular system including: configuring a unit resource in a particular resource group of each spreading code for removing inter-cell interference with basic resources which are farthest away from a frequency and time domain; combining a pseudo random code vector with each unit resource according to a cell type or a cell identification (ID) of a corresponding cell; spreading each transmission data symbol using the pseudo random code vector combined with the unit resource, and transmitting the spread transmission data symbol using a basic resource configuring a corresponding unit resource, when a resource group for removing inter-cell interference of a specific spreading factor is allocated; and receiving the transmitted signals, removing inter-cell interference using despreading and a MIMO detector, and restoring a required data symbol.

According to yet another aspect of the present invention, there is provided an inter-cell interference mitigation method in an OFDMA-based cellular system including: configuring a unit resource in a particular resource group for each spreading code for removing inter-cell interference with basic resources which are closest from a frequency and time domain; combining each unit resource with an orthogonal coded vector according to a cell type of a corresponding cell; spreading each transmission data symbol using the orthogonal coded vector combined with the unit resource, and transmitting the spread transmission data symbol using a basic resource configuring a corresponding unit resource, when a resource group for removing inter-cell interference of a specific spreading factor is allocated; and receiving the transmitted signals, removing interference symbols using a different spreading code vector from a required data symbol via despreading, removing an interference symbol which uses an orthogonal code identical to the required data symbol, and restoring a required data symbol.

BRIEF DESCRIPTION OF DRAWINGS

FIG. 9 is a flowchart illustrating an inter-cell interference mitigation method according to an exemplary embodiment of the present invention.

MODE FOR THE INVENTION

Hereinafter, an inter-cell interference mitigation method in an orthogonal frequency division multiple access (OFDMA)-based cellular system will be described in detail by referring to accompanied drawings according to exemplary embodiments of the present invention.

The present invention is based on a fractional frequency reuse method which can mitigate inter-cell interference by removing inter-cell interference using a multiple receiving antenna and a spreading code with respect to a downlink control channel which should be receivable by all terminals or for users in a cell boundary who is exposed to inter-cell interference due to irregular cell arrays or shadowing phenomenon, and provides the following access method described hereinafter. Such access method configures, separately from resources employing a fractional frequency reuse method, a resource group having a frequency reuse factor of 1 for removing inter-cell interference, and may be combined with any fractional frequency reuse methods.

Figure 1:
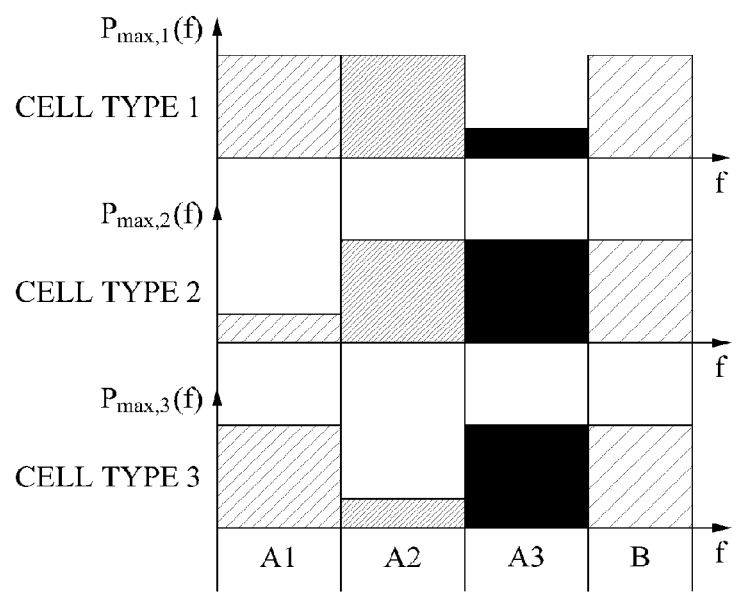
FIGS. 1 and 2 are diagrams illustrating a fractional frequency reuse method for removing inter-cell interference according to an exemplary embodiment of the present invention.
Figure 2:
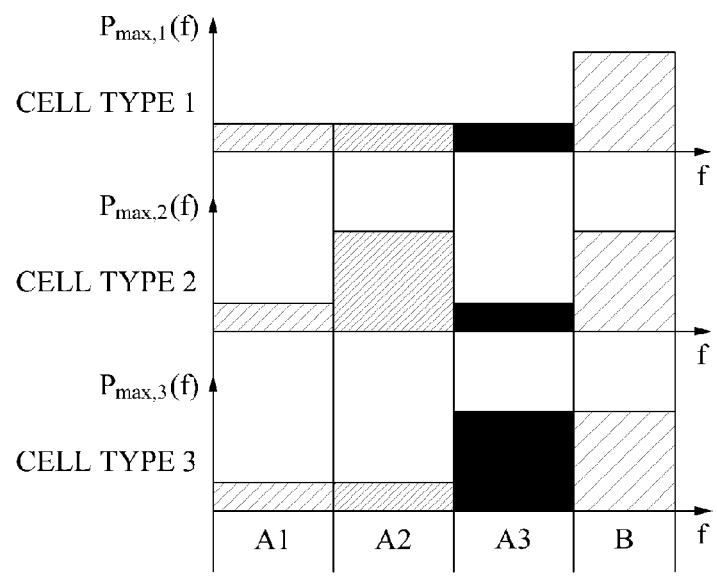

FIGS. 1 and 2 are diagrams illustrating a fractional frequency reuse for removing inter-cell interference according to an exemplary embodiment of the present invention.

Referring to FIGS. 1 and 2, the fractional frequency reuse method divides wireless resources into resource groups A1, A2, and A3 numbering the same as a number of cell types of fractional frequency reuse, and has patterns of a maximum transmission power ($P_{max}$, I=1, 2, 3) permitted per resource group to be different according to cell types. For users inside a cell with less inter-cell interference, it is possible to allocate any wireless resources under the assumption of allocating a lower maximum transmission power. A number of a resource group permitting higher maximum transmission power for users in a cell boundary varies according to a fractional frequency reuse method, and the resource groups permitting the higher maximum transmission power also vary per cell type. The fractional frequency reuse method takes into consideration a location of the users in the cell boundary among the resource group permitted with the higher maximum transmission power or takes into consideration cell types of estimated interference signals, thereby mitigating inter-cell interference by not giving the interferences to the users in the cell boundary of adjacent cells or by allocating resources of the resource group with small interferences.

Also, in the present invention, besides the resource groups A1, A2 and A3, a resource group B having a frequency reuse factor of 1 is separately provided for removing the inter-cell interference, and this resource group B is allocated to configure uplink and downlink traffic channels and a control channel for terminals in the cell boundary.

Figure 3:
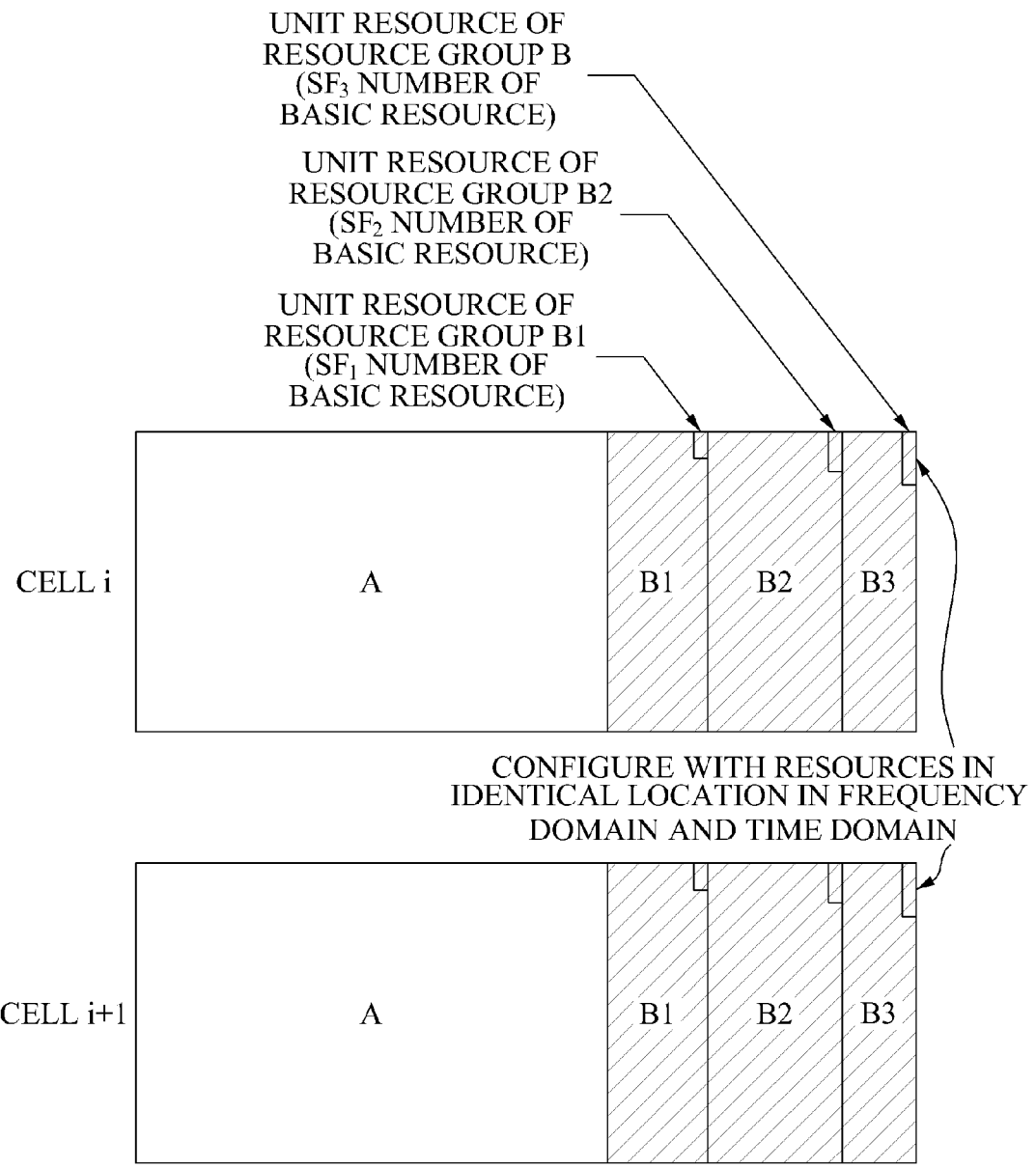
FIG. 3 is a diagram illustrating a detailed configuration of a resource group having a frequency reuse factor of 1 for removing inter-cell interference according to an exemplary embodiment of the present invention.

FIG. 3 is a diagram illustrating a detailed configuration of a resource group having a frequency reuse factor of 1 for removing inter-cell interference.

Referring to FIG. 3, wireless resources are divided into a wireless group A for fractional frequency reuse, and a resource group B for removing inter-cell interference. The resource group B of each cell is further divided into separate resource groups according to spreading factors (SF) of spreading codes. A unit resource of the resource group B1 consists of an $SF_1$, number of a basic resource, the $SF_1$, being a spreading factor of a corresponding resource group, and a basic resource consists of one OFDM symbol and one subcarrier in an OFDM signal. Similarly, unit resources of the resource groups B2 and B3 consist of an $SF_2$ number and an $SF_3$ number of a basic resource respectively. Each of the unit resources in the resource groups B1, B2, and the others consists of basic resources of identical frequency and time per cell, and each transmission data symbol is spread using a unit resource of a selected resource group and is transmitted using an appropriate spreading code multiplying the spread transmission data symbol $SF_1$, times.

The following allocation method is about allocating a resource of the resource groups being configured according to the above described method to each channel. First, for a user requiring resource allocation, in the case of a user inside a cell having an estimated signal to interference ratio (SIR) being larger than a predetermined threshold, a resource of the resource group A for fractional frequency reuse is basically allocated. Conversely, in the case of a user in a cell boundary having an SIR is smaller than the predetermined threshold, with respect to all cases of allocating each of particular resource groups B1, B2, and the others within the resource group for removing interference and of allocating a resource group for users in the cell boundary who are permitted a maximum transmission power among resource groups for fractional frequency reuse, by considering an estimated signal to noise ratio (SNR), a number and a type of interferences, an SIR per each interference signal, a number of antennas of a transmitter/receiver, and required performances, a resource in a group in which largest spectrum efficiency or a similar metric to the largest spectrum efficiency is allocated. Also, in the case of a downlink control channel which should be receivable by all terminals, a spreading factor is determined according to requirements and performance for a corresponding channel and a resource in a resource group of the spreading factor within the resource group for removing inter-cell interference is allocated.

When SF=1, a multiple receiving antenna is exclusively used to remove the inter-cell interference. When a number of a receiving antenna is $N_{Rx}$, and a number of a transmission antenna $N_{Tx}$, is equal to $N_{Rx}$, or less than $N_{Rx}$, the $N_{Rx}$, number of symbols may be simultaneously transmit and restore the $N_{Rx}$, number of symbols using a Multi-Input Multi-Output (MIMO) receiving technique. Using such property, when each transmitter transmits/receives a single stream only, the cell boundary (downlink) or in a base stations (uplink) may remove $N_{Rx}-1$ number of inter-cell interferences in the user.

Figure 4:
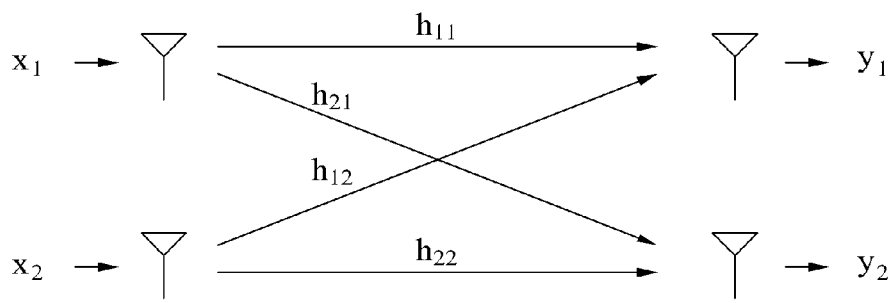
FIG. 4 is a diagram illustrating a multiple-input multiple-output (MIMO) channel when there are two receiving antenna and there is a single inter-cell interference according to an exemplary embodiment of the present invention.

FIG. 4 is a diagram illustration a MIMO channel when there are two receiving antennas and there is a single inter-cell interference according to an exemplary embodiment of the present invention.

Referring to FIG. 4, it is illustrated there is a single inter-cell interference, a number of antennas in all transmitters is $N_{Tx}=1$, and a number of a receiving antennas is $N_{Rx}=2$. As an example, it is assumed that $x_1$ is a desired symbol, and $x_2$ is an inter-cell interference, a receiver with two receiving antennas can restore $x_1$ using a MIMO detector, thereby removing $x_2$. When $N_{Rx}>2$, it is also possible to remove an $N_{Rx}-1$ number of interferences in the same manner.

Figure 5:
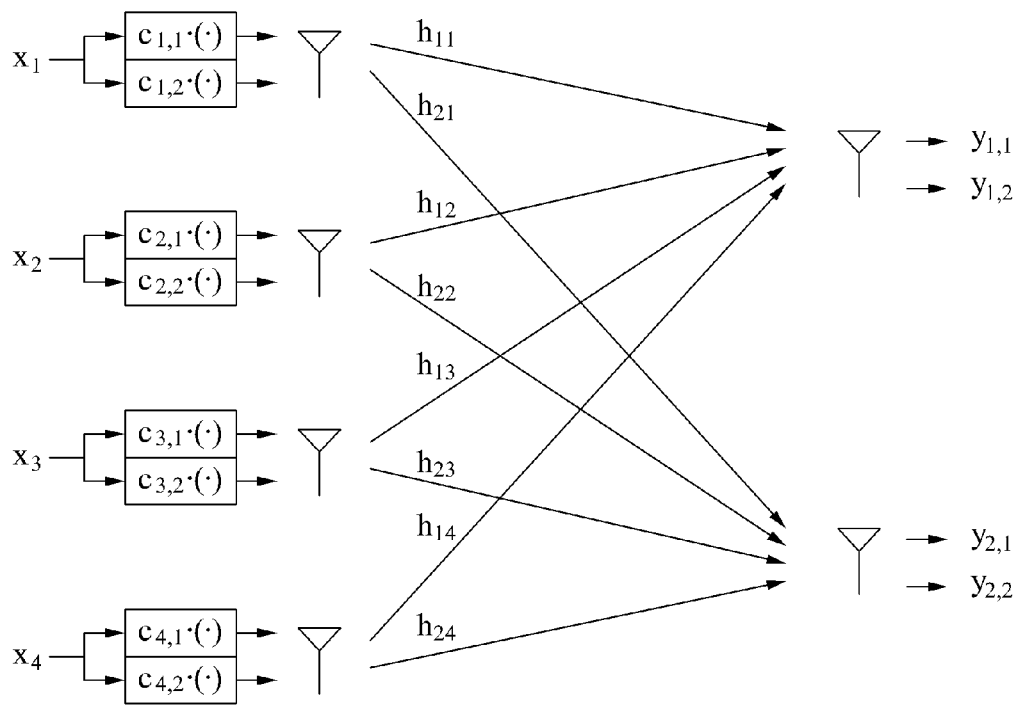
FIG. 5 is a diagram illustrating an MIMO channel having two receiving antenna and three inter-cell interferences according to an exemplary embodiment of the present invention.

FIG. 5 is a diagram illustrating a MIMO channel having two receiving antennas and three inter-cell interferences according to an exemplary embodiment of the present invention.

Referring to FIG. 5, it is illustrated an MIMO channel having three inter-cell interferences, SF=2, a number of antennas in all transmitters is $N_{Tx}=1$, and a number of receiving antennas is $N_{Rx}=2$. When $SF \geq 2$, by using a multiple receiving antenna and a spreading factor, it is possible to remove more interferences. Among $x_i$ (i=1, 2, 3, 4), only one symbol is a desired symbol and the other three symbols are interference symbols.

In each receiver, one data symbol is duplicated resulting in two copies, and the duplicated symbols are spread into corresponding spreading codes of a spreading factor 2, and transmitted using a unit resource of a resource group corresponding to SF=2. Equation 1 represents a received code vector in a receiver.

$$\begin{bmatrix} y_{1,1} \\ y_{1,2} \\ y_{2,1} \\ y_{2,2} \end{bmatrix} = \quad \text{[Equation 1]}$$

-continued $$\begin{bmatrix} h_{11,1}c_{1,1} & h_{12,1}c_{2,1} & h_{13,1}c_{3,1} & h_{14,1}c_{4,1} \\ h_{11,2}c_{1,2} & h_{12,2}c_{2,2} & h_{13,2}c_{3,2} & h_{14,2}c_{4,2} \\ h_{21,1}c_{1,1} & h_{22,1}c_{2,1} & h_{23,1}c_{3,1} & h_{24,1}c_{4,1} \\ h_{21,2}c_{1,2} & h_{22,2}c_{2,2} & h_{23,2}c_{3,2} & h_{24,2}c_{3,2} \end{bmatrix} \begin{bmatrix} x_1 \\ x_2 \\ x_3 \\ x_4 \end{bmatrix} + \begin{bmatrix} w_{1,1} \\ w_{1,2} \\ w_{2,1} \\ w_{2,2} \end{bmatrix}$$

Here, $y_{i,k}$ (i=1, 2; k=1, 2) is a $k^{th}$ basic resource received signal from an $i^{th}$ receiving antenna, and $h_{ij,k}$ (i=1, 2; j=1, 2, 3, 4; k=1, 2) is a channel frequency response between the $i^{th}$ receiving antenna and a $j^{th}$ transmitter antenna with respect to a $k^{th}$ basic resource signal. $c_{j,k}$ (j=1, 2, 3, 4; k=1, 2) is an element of a spreading code which is multiplied to the $k^{th}$ basic resource in the $j^{th}$ transmitter, and $x_j$ (j=1, 2, 3, 4) is a data symbol transmitted via the $j^{th}$ transmitter, and $w_{i,k}$ (i=1, 2; k=1, 2) represents white Gaussian noise added to the $k^{th}$ basic resource signal in the $i^{th}$ receiving antenna.

When a unit resource for data symbol transmission is configured using basic resources closest in a time and the frequency domain, it is possible to define $h_{ij,1}=h_{ij,2}$ (i=1, 2; j=1, 2, 3, 4) and a receiving code vector $y=[y_{1,1} y_{1,2} y_{2,1} y_{2,2}]^T$ may be represented by, $$y = CHx + w = \begin{bmatrix} c_1 & 0 & c_3 & 0 \\ 0 & c_2 & 0 & c_4 \end{bmatrix} \begin{bmatrix} H_A & 0 \\ 0 & H_B \end{bmatrix} x + w \quad \text{[Equation 2]}$$

Here, $$c_i = \begin{bmatrix} c_{i,1} \\ c_{i,2} \end{bmatrix}, H_A = \begin{bmatrix} h_{11} & h_{12} \\ h_{21} & h_{22} \end{bmatrix}, H_B = \begin{bmatrix} h_{13} & h_{14} \\ h_{23} & h_{24} \end{bmatrix}.$$

The code vector in a receiver after despreading $z=[z_{1,1} z_{1,2} z_{2,1} z_{2,2}]^T$ is as shown in Equation 3.

$$z = C^H y = \begin{bmatrix} c_1^H c_1 & 0 & c_1^H c_3 & 0 \\ 0 & c_2^H c_2 & 0 & c_2^H c_4 \\ c_3^H c_1 & 0 & c_3^H c_3 & 0 \\ 0 & c_4^H c_2 & 0 & c_4^H c_4 \end{bmatrix} \begin{bmatrix} H_A & 0 \\ 0 & H_B \end{bmatrix} x + w' \quad \text{[Equation 3]}$$

Here, $$w' = C^H w = [w'_1 \ w'_2 \ w'_3 \ w'_4]^T.$$

If a spreading signal of
$c_i^H c_i = 1$
is selected for all i's, z may be defined as in Equation 4.

$$z = \begin{bmatrix} H_A & C_1 H_B \\ C_1^H H_A & H_B \end{bmatrix} x + w' \quad \text{[Equation 4]}$$

Here, $$C_1 = \begin{bmatrix} c_1^H c_3 & 0 \\ 0 & c_2^H c_4 \end{bmatrix}.$$

If $c_1 \perp c_3$, $c_2 \perp c_4$, orthogonal codes such as Walsh codes are
$c_1 = c_2$
,
$c_3 = c_4$ since the same number of orthogonal codes as a length of the code exist. Consequently, since
$C_1 = 0$
, z may be defined as the following Equation.

$$z = \begin{bmatrix} H_A & 0 \\ 0 & H_B \end{bmatrix} x + w' \quad \text{[Equation 5]}$$

Consequently, z may be divided into the following two Equations in Equation 6.

$$z_A = H_A x_A + w'_A \quad \text{[Equation 6]}$$
$$z_B = H_B x_B + w'_B$$

Here, $$z_A = \begin{bmatrix} z_{1,1} \\ z_{1,2} \end{bmatrix}, z_B = \begin{bmatrix} z_{2,1} \\ z_{2,2} \end{bmatrix}, x_A = \begin{bmatrix} x_1 \\ x_2 \end{bmatrix},$$

$$x_B = \begin{bmatrix} x_3 \\ x_4 \end{bmatrix}, w'_A = \begin{bmatrix} w'_1 \\ w'_2 \end{bmatrix}, w'_B = \begin{bmatrix} w'_3 \\ w'_4 \end{bmatrix}$$

Thus, $x_A$ and $x_B$ may be detected using a 2×2 MIMO detector, and in order to detect a desired symbol, MIMO detection is required to be performed with respect to vectors including the desired symbol, between $x_A$ and $x_B$.

As described above, when there are three inter-cell interferences, SF=2, a number of antennas in all transmitter is $N_{Tx}=1$, and a number of receiving antennas is $N_{Rx}=2$, it is possible to detect the desired symbol using one 2×2 MIMO detector through configuring a unit resources with closest basic resources in a time and frequency domain, and also through using an orthogonal code such as Walsh code for a spreading code.

Assuming $x_4=0$, for the purpose of evaluating how a desired symbol may be detected in the case there are two inter-cell interferences in the same conditions, each of $z_A$ and $z_B$ are represented as in Equation 7.

$$z_A = H_A x_A + w'_A \quad \text{[Equation 7]}$$
$$z_B = H_B \begin{bmatrix} x_3 \\ x_4 \end{bmatrix} + w'_B$$

$x_A$ may be detected using a 2×2 MIMO detector as the above, however, as $x_B$ may be detected using a matched filter such described as below instead of using the MIMO detector.

$$\hat{x}_3 = \frac{(h_{13} + h_{23})^*}{\|h_{13} + h_{23}\|^2} z_3 \quad \text{[Equation 8]}$$

To further generalize the above description, regardless of a number of interferences, a desired symbol and an interference symbol using another spreading code vector are initially removed through despreading in either a receiver or a transmitter using the spreading factor. Also, an interference symbol using an identical spreading code vector to the desired data symbol is removed via a MIMO detector in the receiver. Here, a number of interference removable via the MIMO detector is $N_{Rx}-1$ in the case a number of antennas is $N_{Rx}$, and for this, $N_{Rx} \times N_{Rx}$, MIMO detectors are required.

In all cells of a cellular system, a limited number of orthogonal codes are required to be shared (two orthogonal code vectors exist when SF=2), consequently frequency resource reuse is mandatory. In consideration of a cell array in a cellular system, as a number of a pattern of resource reuse is required to be at least three, at least three cell types for orthogonal code vector reuse are required to be defined and an orthogonal code is required to be allocated accordingly. In this instance, a basic rule for the allocation is that, a number of cell types using the identical orthogonal code vector within an entire cell type group should be equal to or smaller than a reference number of receiving antennas in order to remove interference using the MIMO detector. Generally, a number of receiving antennas in each of terminals and base stations are not constant, however an appropriate reference number should be established by considering a system capacity or spectrum efficiency of users in a cell boundary. In future cellular systems, since it is estimated that each system is to have at least two receiving antennas, the case that there are two reference antennas will be described in this specification. In such an assumption, in the case that there are at least three receiving antennas, it is possible to remove more interference using the identical code vectors in comparison to the case of using two receiving antennas. Conversely, since a receiver having one antenna which is smaller number than two is not able to remove the interferences using the identical code vectors, and thus shall perform the reception with the interference using the identical code vector, consequently the receiver having one antenna is required to consider the interference as a background noise.

Figure 6:
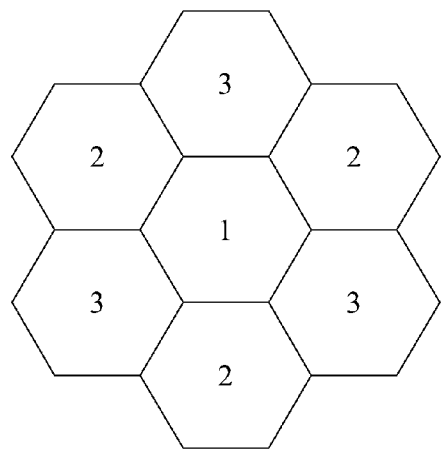
FIG. 6 is a diagram illustrating a regular cell array when there are three or four cell types.
Figure 6:
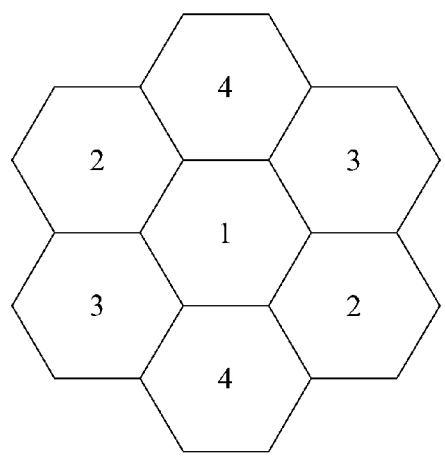

FIG. 6 is a diagram illustrating a regular cell array when there are three or four cell types.

Referring to FIG. 6, it is illustrated a regular cell array in the case there are three or four cell types. The simplest way to allocate an orthogonal signal is to follow the above described basic rule for the allocation, and to allocate the orthogonal code vector fixed in each cell type. In an assumption that each of two orthogonal code vectors is $c_1, c_2$, exemplary embodiments for the allocation of the orthogonal code vectors are as follows:

(1) In the case there are three cell types (reference numeral 610)
Cell type 1: $c_1$
Cell type 2: $c_2$
Cell type 3: $c_2$ (2) In the case there are four cell types (reference numeral 620)
Cell type 1: $c_1$
Cell type 2: $c_1$
Cell type 3: $c_2$
Cell type 4: $c_2$ In the case of allocating the orthogonal code vectors fixed as above, as an example, when there are two inter-cell interferences as in a boundary area of three cells, receiving performance is relatively improved in a cell type which uses an orthogonal code vector different from the other two cell types. According to existence of an interference signal which uses the identical code vector to the allocated spreading code vector, an issue of irregular performance may occur in which there are differences in receiving performance. Also, as the orthogonal code vector is fix-allocated to each cell type, there is an issue of interference fixation in which types of interferences which are respectively removed by the orthogonal factor and the MIMO detectors are being fixed per cell type.

As an effort to regular performance and to enhance diversity of interferences, instead of fix-allocating two orthogonal code vectors to each cell type, it is possible to configure a code vector sequence group having a predetermined length, which maximizes performance regularity and interference diversity having two code vectors as elements, and possible to allocate such code vector sequence group to each cell type.

The following describes optimal orthogonal code vector sequence groups with respect to the case of a number of cell type of 4 when SF=2 and a reference number of receiving antennas is at least 2.

In the case there are four cell types
Group 1: $\{c_1, c_2, c_1\}$, $\{c_1, c_1, c_2\}$, $\{c_2, c_1, c_1\}$, and $\{c_2, c_2, c_2\}$
Group 2: $\{c_2, c_1, c_2\}$, $\{c_2, c_2, c_1\}$, $\{c_1, c_2, c_2\}$, and $\{c_1, c_1, c_1\}$ The optimal orthogonal code vector sequence groups, with respect to the case there are three cell types, are subsets of each of sequence groups in the case there are four cell types.

$\{c_1, c_2, c_1\}$, $\{c_1, c_1, c_2\}$, $\{c_2, c_1, c_1\}$
$\{c_1, c_2, c_1\}$, $\{c_1, c_1, c_2\}$, $\{c_2, c_2, c_2\}$
$\{c_1, c_2, c_1\}$, $\{c_2, c_1, c_1\}$, $\{c_2, c_2, c_2\}$
$\{c_1, c_1, c_2\}$, $\{c_2, c_1, c_1\}$, $\{c_2, c_2, c_2\}$
$\{c_2, c_1, c_2\}$, $\{c_2, c_2, c_1\}$, $\{c_1, c_2, c_2\}$
$\{c_2, c_1, c_2\}$, $\{c_2, c_2, c_1\}$, $\{c_1, c_1, c_1\}$
$\{c_2, c_1, c_2\}$, $\{c_1, c_2, c_2\}$, $\{c_1, c_1, c_1\}$
$\{c_2, c_2, c_1\}$, $\{c_1, c_2, c_2\}$, $\{c_1, c_1, c_1\}$

In each case, the allocation of code vector sequences according to an exemplary embodiment is as follows:

(1) In the case there are three cell types (reference numeral 610)
Cell type 1: $\{c_1, c_2, c_2\}$
Cell type 2: $\{c_2, c_1, c_2\}$
Cell type 3: $\{c_2, c_2, c_1\}$ (2) In the case there are four cell types (reference numeral 620)
Cell type 1: $\{c_1, c_2, c_2\}$
Cell type 2: $\{c_2, c_1, c_2\}$
Cell type 3: $\{c_2, c_2, c_1\}$
Cell type 4: $\{c_1, c_1, c_1\}$ In the above sequence groups, s number of cell types which use the identical code vector among all cell types (in each case, there are either three or four cell types) is equal to or less than a reference number of a receiving antenna of 2, that is 2 or 1. In two predetermined cell types, a frequency to use the identical code vector is the same as ⅓ the frequency, and in three predetermined cell types, a frequency of each cell type using the identical code vector to other cell types is the same as ⅓ the frequency. Also, in four random cell types, the frequency for one cell type to use the identical code vector at an identical time point to other cell types is the same as ⅓ the frequency.

All the description based on the case of SF=2 can easily be expanded to a case of SF≥3. That is, an SF number of orthogonal codes with lengths of SF per cell type (e.g. phase shift orthogonal code) is allocated to each cell type or a number of code vectors numbering the same as a number of cell types which are configured using the SF number of the orthogonal codes with the lengths of SF per cell type to each cell type, and inter-cell interference is performed with respect to the remaining cells by expanding SF=2.

Generalized rules for configuring an orthogonal code vector sequence group when there is an N number of cell types are as follows:

Among an N number of cell types, a number of cell types using an identical code vector at an identical point in time should not exceed a reference number of receiving antennas.

Among a predetermined number of cell types of 2, 3, ..., and N, a frequency of each cell type, which uses an identical code vector at an identical point in time to each of other cells, is required to be as close as possible to a frequency of each of other cells (For interference diversification and performance averaging).

The cell type for such orthogonal code reuse is not necessary to be identical to a cell type for fractional frequency reuse.

Up to now, it is described that the case of configuring a unit resource for data symbol transmission using basic resources which are closest in time and frequency domain and the case of using a spreading factor as an orthogonal code. Under identical conditions, a unit resource for data symbol transmission is configured with farthest basic resources in time and frequency domain. In $h_{ij,1} \neq h_{ij,2}$ (i=1, 2; j=1, 2, 3, 4), assuming that a pseudo noise code is used as a spreading factor, when the previously represented Equations are used with respect to the case of SF=2, z does not divide into two Equations. Thus, to detect a desired symbol, a 4×4 MIMO detector is required. To further generalize this, when configuring the unit resource for data symbol transmission the farthest basic resources from a time and frequency domain and using the pseudo noise code as the spreading factor, it is possible to remove up to $N_{Rx}*SF-1$ number of interferences, however, for this, a $(N_{Rx}.SF) \times (N_{Rx}.SF)$ MIMO detector is required.

In this instance, the spreading factor cannot be used to directly remove the desired data symbol and the other code vectors. Instead, the spreading factor may be used to improve correlation between channel response properties of the basic resources which configure the unit resource for data symbol transmission. Also, since a poly-phase sequence may be used for the pseudo noise code instead of a binary sequence, relatively more code vectors may exist than the identical SF. Consequently, a range of selections for a length of code vector sequence for allocating a spreading code sequence and a number of cell types and the others is wider. Thus, it is possible to have the cell type for allocation of the spreading code to be identical to a cell type of fractional frequency reuse, and in an extreme case, it is possible to have the cell type for allocation of the spreading code to be identical to cell identification (ID).

An approach method of inter-cell interference mitigation method for users in a cell boundary who are exposed to inter-cell interference caused from irregular cell arrays or caused by shadowing based on fractional frequency reuse by removing inter-cell interference using a multiple receiving antenna and a spreading code is to configure a resource group for removing inter-cell interference within each of resource groups for fractional frequency reuse. Such an approach also may be used in combination with any other fractional frequency reuse method.

Figure 7:
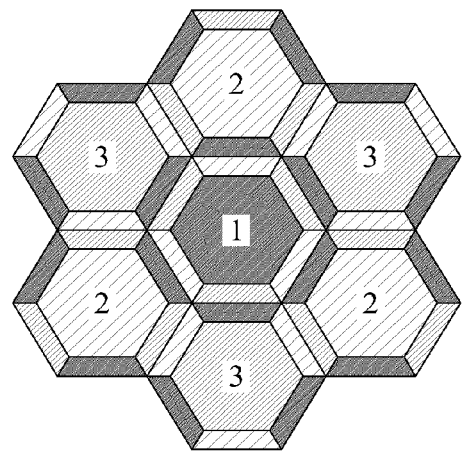
FIG. 7 is a diagram illustrating a configuration of a resource group for removing inter-cell interference within each resource group according to a fractional frequency reuse method, when a cell boundary frequency reuse factor is 2, according to an exemplary embodiment of the present invention.
Figure 7:
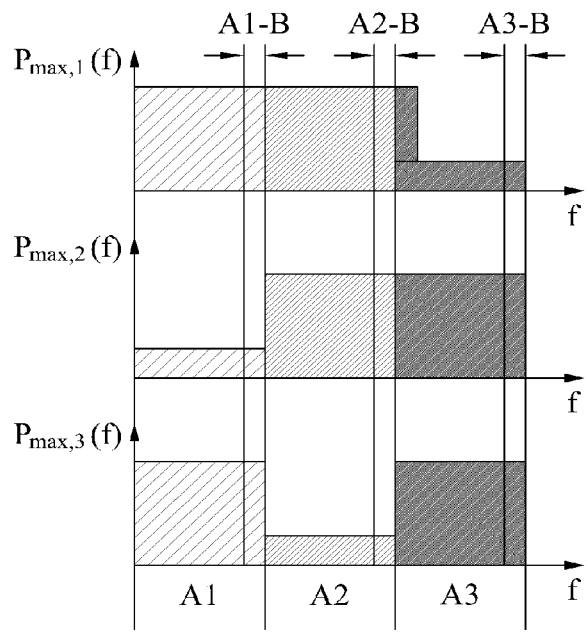

FIG. 7 is a diagram illustrating a configuration of a resource group for removing inter-cell interference within each resource group according to a fractional frequency reuse method, when a cell boundary frequency reuse factor is 2, according to an exemplary embodiment of the present invention.

Figure 8:
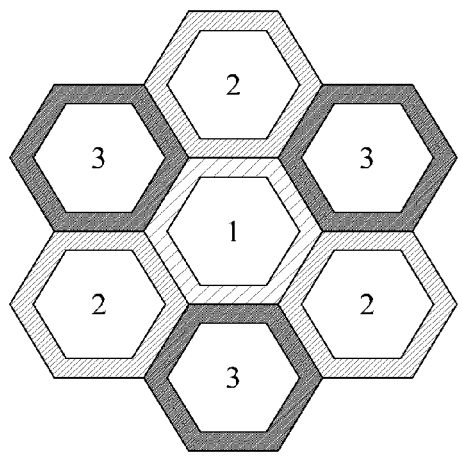
FIG. 8 is a diagram illustrating a configuration of a resource group for removing inter-cell interference within each resource group according to a fractional frequency reuse method, when a cell boundary frequency reuse factor is 3, according to an exemplary embodiment of the present invention.
Figure 8:
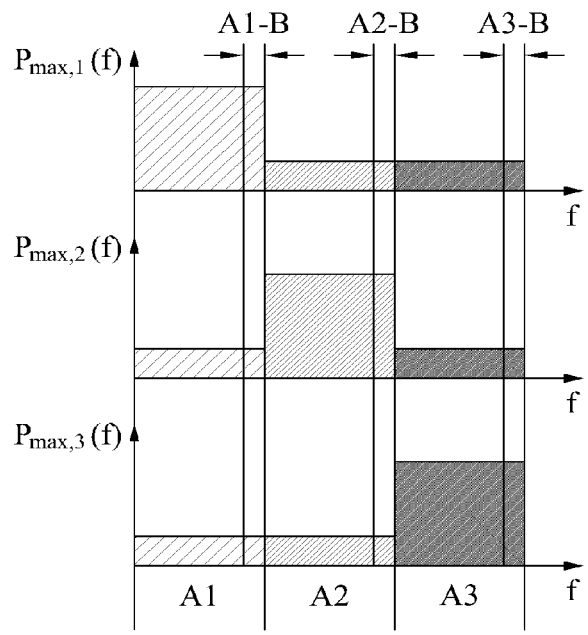

FIG. 8 is a diagram illustrating of a configuration of a resource group for removing inter-cell interference within each resource group according to a fractional frequency reuse method, when a cell boundary frequency reuse factor is 3, according to an exemplary embodiment of the present invention.

Referring to FIGS. 7 and 8, a configuration, according to an exemplary embodiment of the present invention, of a resource group for removing inter-cell interference within each resource group for fractional frequency reuse of when a cell boundary frequency reuse factor is 2, reference numerals 710 and 720 and of when a cell boundary frequency reuse factor is 3, reference numerals 810 and 820, is illustrated. In the fractional frequency reuse method, the wireless resource is divided into resource groups for the fractional frequency reuse A1, A2, and A3, and a different pattern of a maximum transmission power ($P_{max,i}$ (I=1, 2, 3)) applied on each resource group are applied for each cell type to encourage avoidance of inter-cell interferences, thereby devising inter-cell interference avoidance. Here, particular resource groups A1-B, A2-B, and A3-B are respectively provided for removing inter-cell interference within existing resource groups A1, A2, and A3, and the resource groups are allocated to configure uplink and downlink traffic channels for terminals on a cell boundary and to configure a control channel for specific users. Each of the particular resource groups A1-B, A2-B, and A3-B is re-divided into separate resource groups for each spreading factor of a spreading code. As an example, A1-B is divided into A1-B1, A1-B2, and . . . , and a unit resource of A1-B1, A1-B2, and . . . , respectively consists of an $SF_1$, $SF_2$, and . . . , number of basic resources. Each unit resource of the resource groups A1-B1, A1-B2, and . . . , consists of basic resources with identical time and frequency per cell, and each transmission data symbol is spread $SF_i$, times using the unit resource of a selected resource group to be transmitted.

A method for allocating the resource of the resource group configured as the above to each channel is as follows: First, for users in the cell boundary with an estimated SIR being less than a predetermined threshold, with respect to both a case of respectively allocating a particular resource group for each spreading factor for removing inter-cell interference among resource groups permitted with a maximum transmission power, and a case of allocating a resource except for the portion for removing inter-cell interference, a resource of a group, which can expect largest spectrum efficiency or a similar metric to the largest spectrum efficiency when considering an estimated SNR, a number and a type of interferences, an SIR per interference signal, a number of antennas in a receiver/transmitter, and required performance, is allocated. For users inside the cell with an SIR being greater than a predetermined threshold, a resource of a particular resource group with lower transmission power permitted (including the resource group for removing inter-cell interferences inside a cell) is allocated first.

A transmission and reception method using the particular resource groups for removing inter-cell interference is, besides the resource employing fractional frequency reuse which is the first access method, identical to the case of configuring a resource group whose frequency reuse factor for removing inter-cell interference is 1.

Above, the case of a single transmission antenna is described, yet a base station and a terminal in a cellular system may have multiple transmission antennas as well as multiple receiving antennas. To remove interference using multiple receiving antennas, it is convenient not to apply spatial multiplexing and spatial division multiple access. Consequently, when a number of transmission antennas is at least two, it is possible to enhance a capacity of a link by simultaneously employing transmission diversity scheme using two transmission antennas.

FIG. 9 is a flowchart illustrating an inter-cell interference mitigation method according to an exemplary embodiment of the present invention.

Referring to FIG. 9, in operation S910, an ODFMA cellular system divides wireless resources into a resource group for fractional frequency reuse and a resource group for removing inter-cell interference. As an example, in operation S910, the OFDMA cellular system may divide the wireless resources into the resource group for fractional frequency reuse and the resource group for removing inter-cell interference with a frequency reuse factor is 1.

In operation S920, the OFDMA cellular system re-divides the resource group for fractional frequency reuse into particular resource groups numbering the same as a number a number of cell types of fractional frequency reuse. In other words, in operation S920, the OFDMA cellular system re-divides the resource group for fractional frequency reuse into particular resource groups numbering the same as the number of cell types of fractional frequency reuse, and applies a maximum transmission power to a particular resource group according to a cell type for fractional frequency reuse.

In operation S930, the OFDMA cellular system re-divides the resource group for removing inter-cell interference into the particular resource groups for each the spreading factor. In other words, in operation S930, the OFDMA cellular system re-divides the resource group for removing inter-cell interference into the particular resource groups for each spreading factor, and re-divides the re-divided resource groups for each spreading factor into a unit resource consisting of basic resources numbering the same as a number of a spreading factor in an identical location in all cells, and combines a spreading code vector with each unit resource according to a corresponding cell type.

In operation S940, the OFDMA cellular system allocates the particular resource groups depending on whether a user is inside a cell or a user is in a cell boundary.

As an example, in operation S940, the OFDMA cellular system may allocate a particular resource set in which a greater transmission power than a reference value is allowed, among the divided particular resource group for fractional frequency reuse, to the user in the cell boundary whose estimated SIR is less than a threshold.

As an example, in operation S940, the OFDMA cellular system may allocate, with respect to all cases of respectively allocating the divided particular resource group for each spreading factor, a resource in a resource group capable of estimating a greatest spectrum efficiency or a resource in a group capable of estimating a similar metric to the greatest spectrum efficiency, based on an estimated SNR, a number of interferences, an SIR for each interference signal, a number of transmission antennas, and a required performance.

As an example, in operation S940, the OFDMA cellular system may allocate a resource in the divided resource group for fractional frequency reuse to the user inside the cell whose SIR is greater than a threshold.

In operation S950, the OFDMA cellular system may initially allocate the resources of the resource group for each spreading factor according to the required performance of a downlink control channel. In other words, in operation S950, the OFDMA cellular system may allocate the resources of the resource group for each spreading factor according to the required performance of a downlink control channel, which is receivable by all terminals.

In operation S960, the OFDMA cellular system may spread each transmission data symbol using a spreading code vector combined with each unit resource, and transmit the spread transmission data symbol using a basic resource which configures a corresponding unit resource, when the resource group for removing inter-cell interference of the spreading factor is allocated.

In operation S970, the OFDMA cellular system may receive a desired signal or interference signals, and restore a data symbol according to the spreading factor. As an example, when a spreading factor is 1, the OFDMA cellular system may restore the desired data symbol using a MIMO detector in operation S970. As an example, when the spreading factor is more than 2, the OFDMA cellular system may restore the desired data symbol by removing inter-cell interference using a MIMO detector based on multi receiving antennas and dispreading using the spreading vectors of the desired data in operation S970.

Therefore, the present invention may mitigate inter-cell interferences by employing a fractional frequency reuse method based on interference avoidance, improve spectrum efficiency of users in a cell boundary by removing inter-cell interferences which have not been reduced to a predetermined level by irregular cell arrays or shadowing using multiple receiving antennas and a spreading code, and improve receiving performance for users in the cell boundary by removing inter-cell interferences of a downlink control channel which is receivable in all terminals.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

The invention claimed is:

1. An inter-cell interference mitigation method in an orthogonal frequency division multiple access (OFDMA)-based cellular system, the method comprising:
dividing wireless resources into a resource group for fractional frequency reuse and a resource group for removing inter-cell interference;
re-dividing the resource group for fractional frequency reuse into particular resource groups numbering the same as a number of cell types of fractional frequency reuse;
generating maximum transmission power patterns per cell types of fractional frequency reuse for the particular resource groups; and
applying a maximum transmission power to a particular resource group according to the maximum transmission power patterns.

2. An inter-cell interference mitigation method in an OFDMA-based cellular system, the method comprising:
dividing wireless resources into a resource group for fractional frequency reuse and a resource group for removing inter-cell interference;
re-dividing the resource group for fractional frequency reuse into particular resource groups numbering the same as a number of cell types of fractional frequency reuse;
re-dividing the resource group for removing inter-cell interference into particular resource groups for each spreading factor;
allocating a particular resource group depending on a user in a cell boundary or a user inside a cell;
allocating a resource in the resource group for each spreading factor according to required performance of a downlink control channel;
spreading each transmission data symbol using a spreading code vector combined with each unit resource, and transmitting the spread transmission data symbol using a basic resource configuring a corresponding unit resource, when the resource group for removing inter-cell interference of the spreading factor is allocated; and
restoring a data symbol according to a spreading factor by receiving required signals or interference signals.

3. The method of claim 2, wherein the dividing of the wireless resources into the resource group for fractional frequency reuse and the resource group for removing inter-cell interference divides wireless resources into the resource group for fractional frequency reuse and a resource group with a frequency reuse factor of 1 for removing inter-cell interference.

4. The method of claim 2, wherein the re-dividing of the resource group for fractional frequency reuse into particular resource groups numbering the same as a number of cell types of fractional frequency reuse, re-divides the resource group for fractional frequency reuse into particular resource groups numbering the same as the number of cell types for fractional frequency reuse, and applies a maximum transmission power to the particular resource group according to the cell types for fractional frequency reuse.

5. The method of claim 2, wherein the re-dividing of the resource group for removing inter-cell interference into particular resource groups for each spreading factor re-divides the resource group for removing inter-cell interference into particular resource groups for each spreading factor, re-divides the re-divided resource groups for each spreading factor into a unit resource consisting of basic resources numbering the same as a number of a spreading factor in identical location in all cells, and combines a spreading code vector with each unit resource according to a corresponding cell type.

6. The method of claim 2, wherein the allocating of the particular resource group depending on the user in the cell boundary or the user inside the cell, allocates a particular resource set in which a greater transmission power than a reference value is allowed, among the divided particular resource group for fractional frequency reuse, to the user in the cell boundary whose estimated signal to interference ratio (SIR) is less than a threshold.

7. The method of claim 2, wherein the allocating of the particular resource group depending on the user in the cell boundary or user in the cell inside allocates, with respect to all cases of respectively allocating the divided particular resource group for each spreading factor, a resource in a resource group capable of estimating a greatest spectrum efficiency or a resource in a group capable of estimating a similar metric to the greatest spectrum efficiency, based on an estimated signal to noise ratio (SNR), a number of interferences, an SIR for each interference signal, a number of transmission antennas, and a required performance.

8. The method of claim 2, wherein the allocating of the particular resource group depending on the user in the cell boundary or the user inside the cell initially allocates a resource in the divided resource group for fractional frequency reuse to the user inside the cell whose SIR is greater than a threshold.

9. The method of claim 2, wherein the allocating of the resource in the resource group for each spreading factor according to required performance of the downlink control channel allocates the resource in the divided resource group for each spreading factor to a downlink control channel which is receivable in all terminals, according to required performance of a corresponding channel.

10. The method of claim 2, wherein the restoring of the data symbol according to the spreading factor by receiving required signals or interference signals restores a required data symbol via a multiple-input multiple-output (MIMO) detector when the spreading factor is 1.

11. The method of claim 2, wherein the restoring of the data symbol according to the spreading factor by receiving either required signals or interference signals restores the required data symbol by removing inter-cell interference via the MIMO detector which uses despreading using spreading code vectors of required data and a multiple receiving antenna when the spreading factor is greater than 2.

12. An inter-cell interference mitigation method in an OFDMA-based cellular system, the method comprising:
configuring a unit resource in a particular resource group of each spreading code for removing inter-cell interference with basic resources which are farthest away from a frequency and time domain;
combining a pseudo random code vector with each unit resource according to a cell type or a cell identification (ID) of a corresponding cell;
spreading each transmission data symbol using the pseudo random code vector combined with the unit resource, and transmitting the spread transmission data symbol using a basic resource configuring a corresponding unit resource, when a resource group for removing inter-cell interference of a specific spreading factor is allocated; and
receiving the transmitted signals, removing inter-cell interference using dispreading and a MIMO detector, and restoring a required data symbol.

13. The method of claim 12, further comprising:
configuring an additional resource besides resource groups for fractional frequency reuse for a downlink control channel that all terminals should be able to receive;
re-dividing the resource group for removing inter-cell interference into particular resource groups for each spreading factor;
re-dividing the re-divided particular resource groups for each spreading factor into unit resources consisting of basic resources numbering the same as a spreading factor in an identical location in all cells, and combining spreading code vectors of each unit resource according to a cell type of a corresponding cell; and
allocating a resource in a resource group having an appropriate spreading factor among resource groups for each spreading factor according to required performance of each control channel.

14. The method of claim 12, wherein the spreading of each transmission data symbol, and transmitting of the spread transmission data symbol to the pseudo random code vector combined with the unit resource transmits a signal according to a transmission diversity scheme when more than two transmission antennas exist.

15. An inter-cell interference mitigation method in an OFDM-based cellular system, the method comprising:
configuring a unit resource in a particular resource group for each spreading code for removing inter-cell interference with basic resources which are closest from a frequency and time domain;
combining each unit resource with an orthogonal coded vector according to a cell type of a corresponding cell;
spreading each transmission data symbol using the orthogonal coded vector combined with the unit resource, and transmitting the spread transmission data symbol using a basic resource configuring a corresponding unit resource, when a resource group for removing inter-cell interference of a specific spreading factor is allocated; and
receiving the transmitted signals, removing interference symbols using a different spreading code vector from a required data symbol via despreading, removing an interference symbol which uses an orthogonal code identical to the required data symbol, and restoring a required data symbol.

16. The method of claim 15, wherein the combining of each unit resource with the orthogonal coded vector according to the cell type of the corresponding cell comprises:

configuring an orthogonal code vector sequence group with a predetermine length which maximizes performance equalization and interference diversity including orthogonal code vectors numbering the same as a spreading factor, instead of allocating an orthogonal code vector according to the cell type to unit resources; and allocating each sequence in the orthogonal code vector sequence group, and combining the unit resources and the orthogonal code vector according to the sequence.

17. The method of claim 16, wherein, when a plurality of cell types exist for maximizing the performance equalization and interference diversity, the configuring of the orthogonal code vector sequence group having the predetermined length which maximizes performance equalization and interference diversity configures the orthogonal code vector sequence having regulations with a number of a cell type using an identical code vector at an identical time point among a plurality of cell types is no larger than a reference number of receiving antennas and a frequency of each cell type using an identical code vector at an identical time point to each of remaining cell types as close as possible to a frequency of each of other cells.

* * * * *